PHONOGRAPH RECORD HANDLING DEVICE

Filed April 22, 1953 2 Sheets-Sheet 1

INVENTORS
HAYNE PALMOUR AND
PAUL C. GAERTNER, JR.
BY Herman L. Gordon
ATTORNEY

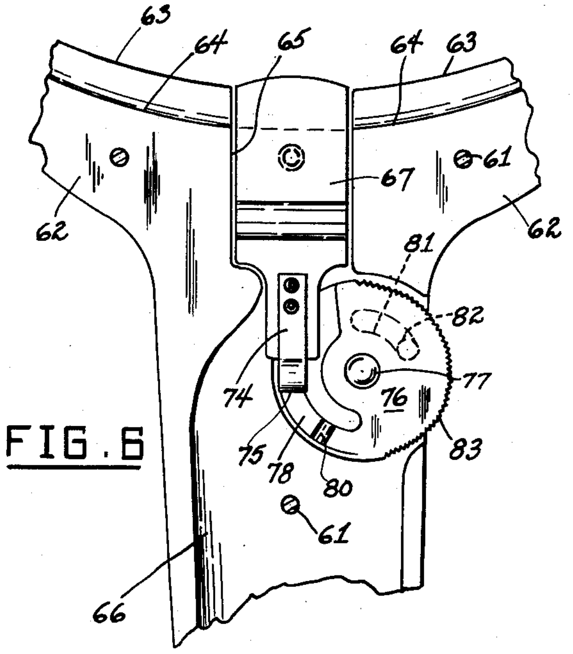
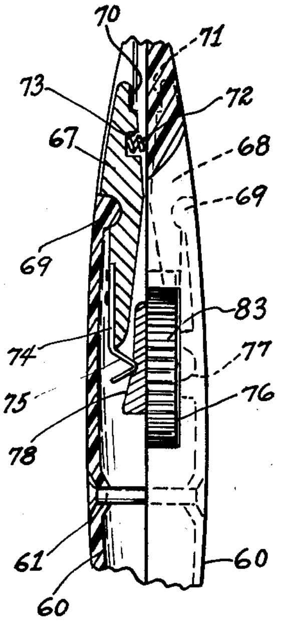
FIG. 7
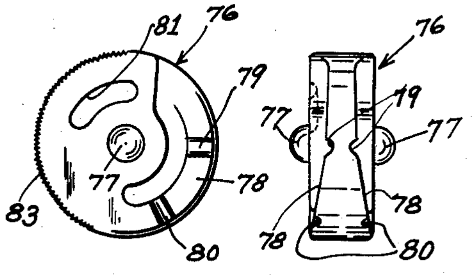
FIG. 8 FIG. 9
INVENTORS
HAYNE PALMOUR AND
BY PAUL C. GAERTNER, JR.
Herman L. Gordon
ATTORNEY United States Patent Office 2,723,877
Patented Nov. 15, 1955

2,723,877

PHONOGRAPH RECORD HANDLING DEVICE

Hayne Palmour, Washington, D. C., and Paul C. Gaertner, Jr., Albuquerque, N. Mex.

Application April 22, 1953, Serial No. 350,420

8 Claims. (Cl. 294—116)

This invention relates to phonograph record carriers, and more particularly to an improved implement for handling valuable phonograph records without requiring the records to be manually touched, whereby damage to the surfaces of the records is avoided.

A main object of the invention is to provide a novel and improved phonograph record handling implement which is simple in construction, which is easy to manipulate, and which provides maximum protection to the surfaces of a record with which it is employed by substantially eliminating the need for manually touching the record when it is being transported from its envelope or album to a record player, and vice versa.

A further object of the invention is to provide an improved phonograph record handling device which is inexpensive to manufacture, which is sturdy in construction, which is compact in size, and which is attractive in appearance.

A still further object of the invention is to provide an improved device for handling and carrying valuable phonograph records which enables the user to obtain a firm and secure grip on the edge of a record disc, while at the same time engaging the peripheral portions of the disc on both sides adjacent the gripped portion to prevent the record from slipping out of the handling device while it is being transported, said device being adaptable for use with substantially equal efficiency for different sizes of record discs.

Further objects and advantages of the invention will become apparent from the following description and claims, and from the accompanying drawings, wherein:

Figure 6 is a fragmentary horizontal cross-sectional view taken through the plane of symmetry of a modified form of phonograph record handling device constructed in accordance with the present invention.

Figure 7 is a fragmentary vertical cross-sectional view, similar to Figure 3, taken through the modified form of the invention illustrated in Figure 6.

Figure 8 is a bottom plan detail view of the rotary cam wheel employed in the form of the invention of Figures 6 and 7.

Figure 9 is an edge elevational detail view of the rotary cam wheel of Figure 8.

Figures 1, 2, 3, 4, 5:
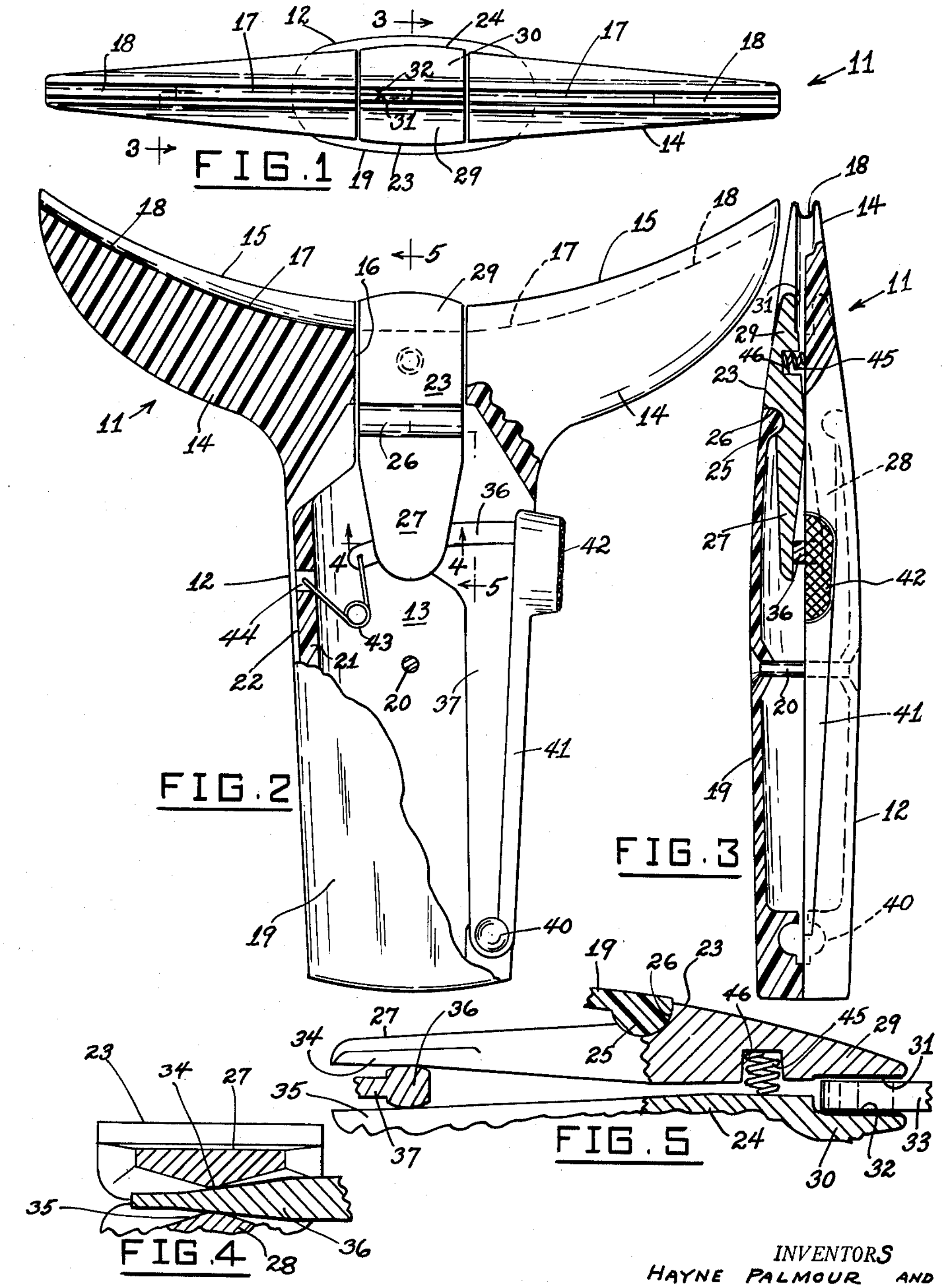
Figure 1 is a front end elevational view of an improved phonograph record handling device constructed in accordance with the present invention.
Figure 2 is a top plan view, partly in horizontal cross-section, of the phonograph record handling device of Figure 1.
Figure 3 is a cross-sectional view taken on line 3—3 of Figure 1.
Figure 4 is an enlarged fragmentary cross-sectional detail view taken on line 4—4 of Figure 2.
Figure 5 is an enlarged fragmentary cross-sectional detail view taken on the line 5—5 of Figure 2.

Referring to the drawings, and more particularly to Figures 1 to 5, 11 generally designates one form of phonograph record handling device according to the present invention. The record handling device 11 comprises a main body 12, of molded plastic or the like, having the concave handle segment 13 and the opposing, tapering wing elements 14, 14, integrally formed with said handle segment. The wing elements 14, 14 are concavely arcuate at their forward edges, as shown at 15, and are separated by a notch 16 having parallel opposing walls and arranged in alignment with the longitudinal axis of the handle portion of the device.

The arcuate forward edges of the wing elements 14, 14 are each formed with the merging grooves 17 and 18 of substantial depth and of sufficient width to receive the rim of a phonograph record disc. The inner groove portions 17 have a radius of curvature slightly smaller than that of the outer groove portions 18, the curvature of the inner groove portions 17 corresponding substantially to the peripheral curvature of a 10-inch phonograph record, whereas the curvature of the outer groove portions 18 corresponds substantially to the peripheral curvature of a 12-inch phonograph record.

Designated at 19 is a concave cover segment engageable on the handle segment 13 to define a hollow handle, the cover segment 19 being secured to the handle segment 13 by a transverse bolt or rivet 20. The handle segment 13 may be provided along its edge with a locking rib 21 and the cover segment 19 may be formed with an interengaging marginal rib element receivable on the seat 22 defined adjacent rib 21 to provide interlocking engagement between the mating segments 13 and 19. The transverse fastener 20 secures the segments in interlocking engagement.

Designated at 23 and 24 are a pair of opposing jaw members of substantial width which are pivotally mounted respectively on the opposing marginal portions of the segments 13 and 19 at the notch 16. Said marginal segment portions are each formed with a semi-cylindrical pivot rib 25 which is rotatably received in a similarly shaped pivot groove 26 formed in the intermediate portion of the jaw member, as shown in Figure 3. The jaw members have inwardly tapering tail portions 27 and 28 disposed inside the hollow handle of the device and have substantially thicker outwardly tapering head portions 29 and 30 arranged in opposition to each other in the notch 16.

The head portion 29 is formed at its inner surface with a clamping seat 31 which faces another clamping seat 32 formed in the inner surface of the opposing jaw head portion 30. The clamping seats 31 and 32 are preferably lined with cushioning material, such as felt or the like, to prevent marring of the marginal surfaces of a phonograph record 33 held between said clamping surfaces. The seats 31 and 32 merge with the arcuate grooves on the opposite sides of the notch 16, whereby the edge of a record disc may be received in the grooves 17, 17 and be clamped by the jaw head portions 29 and 30.

The jaw tail portions 27 and 28 are formed with the opposed cam abutment ribs 34 and 35 between which is engaged a generally wedge-shaped arcuate cam member 36 formed on the end of an arm 37 which is pivotally secured between the mating handle segments 13 and 19. Arm 37 is formed with the opposing hemispherical pivot studs 40, 40 which are rotatably seated in correspondingly shaped pivot seats formed in the segments 13 and 19, as shown in Figures 2 and 3. The arm 37 is formed at its outer edge with the widened flange portion 41 which is movable in a slot provided therefor at one edge of the handle, as by providing opposing elongated notches in the handle segments at their meeting plane at said edge of the handle. The widened flange portion 41 merges with a button element 42 integrally formed on the arm 37 at the outer end of the cam rib 36.

Arm 37 is biased clockwise, as viewed in Figure 2, by a coil spring 43 having one end secured in a recess 44 in rib 21 and having its other end secured to the inner end of cam rib 36, as shown in Figure 2.

As shown in Figure 5, the inner surfaces of the jaw head portions 29 and 30 are biased apart by a coiled spring 45 seated in a recess 46 formed in jaw head 29 and bearing on the opposed inner surface of jaw head 30. When the arm 37 is rotated inwardly, as by grasping the handle of the device and exerting squeezing force on the flange 41 or pressing button 42 inwardly with the thumb, the wedge rib 36 forces the tail portions 27 and 28 of the jaws apart, causing the seats 31 and 32 in the jaw heads to move towards each other to clampingly engage the edge of a record disc inserted in the grooves 17, 17.

Thus, a phonograph record may be clampingly engaged at its rim by the device and withdrawn from its envelope or album without requiring the operator to manually touch the record. When thus clamped, the record may then be carried by the operator to the record playing apparatus and may be deposited on the spindle of said apparatus without manually touching the record. The record may then be released by relaxing the pressure on arm 41 and button 42, leaving the record in playing position on the apparatus. The record may be replaced in its envelope or album by a reverse procedure.

In this manner, a record may be transported by means of the above described device without requiring the user to manually touch the playing surfaces of the record, whereby the risk of damage to said playing surfaces is greatly reduced.

In the form of the invention illustrated in Figures 6 to 9, the device is made in two substantially symmetrical halves 60, 60, of molded plastic or the like, the segments 60, 60 being fastened together by a plurality of transverse bolts or rivets 61. Each segment 60 is integrally formed with the opposing wing segments 62, 62, arranged symmetrically on opposite sides of a jaw notch 65, said wing segments having the concavely arcuate front edges 63, 63. The arcuate edges 63 are recessed along an arcuate path, as at 64, 64, to define a pair of grooves on the opposite sides of the jaw notch 65 when the segments are fastened together in mating relationship. The handle segments are substantially hollow, as shown at 66. The jaws 67 and 68 are pivotally mounted on semi-cylindrical, opposing ribs 69, 69 formed on the segments at the jaw notches 65. The jaw head portions are provided with opposed clamping seats 70 and 71, similar to the clamping seats 31 and 32 of the previously described form of the invention. The jaw head portions are biased apart by a coiled spring 72 seated in a recess 73 in the head portion of jaw 67 and bearing on the inner surface of the head portion of the opposing jaw 68.

Secured to the tail portions of the respective jaws 67 and 68 are respective leaf springs 74 terminating in V-shaped, inwardly directed contact loops 75. Designated at 76 in a cam wheel pivotally secured between the segments 60, 60 at the upper portion of the handle of the device, as shown in Figure 6. The wheel 76 is formed with the opposed central hemispherical pivot studs 77 which are rotatably received in correspondingly shaped pivot recesses provided in the mating segments 60, 60. The inner marginal portions of the opposite surfaces of the wheel 76 are formed with the arcuate cam surfaces 78, 78 arranged concentrically around the axis of the wheel and sloping symmetrically in the manner shown in Figure 9, said surfaces being engaged by the respective V-shaped spring contact elements 75, 75, and being arranged so that said contact elements are wedgingly engaged by said surfaces when the wheel 76 is rotated clockwise, as viewed in Figure 6. This generates a cushioned spreading force on the tail portions of the jaws 67 and 68, causing the head portions of the jaws to be rotated toward each other, whereby the seats 70, 71 engage the rim of a phonograph record with a spring clamping action. The yieldability of said clamping action prevents excessive clamping force from being applied to the record, and in conjunction with a lining of cushioning material on the clamping seats, insures that adequate clamping force will be obtained regardless of variations in thickness of different records with which the device is to be employed.

The cam surfaces 78 are formed with respective radial detent grooves 79 and 80 to lockingly interengage with the spring contact elements 75 to releasably lock the wheel 76 in either released or clamping position.

To limit rotation of the wheel 76 substantially to the range required, one of the surfaces of the wheel is formed with an arcuate detent groove 81, concentric with the axis of the wheel, and a stop lug 82 is provided on the surface of the segment 66 facing groove 81, said lug 82 being received in the groove 81 and limiting rotation of the wheel as above described.

The periphery of the wheel 76 is exposed at one edge of the handle of the device, as shown in Figures 6 and 7, and is suitably serrated or knurled, as shown at 83, to facilitate manual rotation of the wheel.

While certain specific embodiments of an improved phonograph record handling device have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A phonograph disc handling device comprising a handle, a pair of opposed spaced wing members rigidly secured to said handle, said wing members having concavely arcuate front edges formed with aligned grooves to receive the rim of a phonograph disc, and manually controlled disc-clamping means carried by said handle between said wing members and being arranged to clampingly engage the top and bottom surfaces of the disc.

2. A phonograph disc handling device comprising a handle, a pair of opposed spaced wing members rigidly secured to said handle, said wing members having concavely arcuate front edges formed with aligned grooves to receive the rim of a phonograph disc, and a pair of opposed clamping jaws pivotally secured to said handle between said wing members and being arranged to clampingly engage the top and bottom surfaces of the disc.

3. A phonograph disc handling device comprising a handle, a pair of opposed spaced wing members rigidly secured to said handle, said wing members having concavely arcuate front edges formed with aligned grooves to receive the rim of a phonograph disc, a pair of opposed clamping jaws pivotally secured to said handle between said wing members and being arranged to clampingly engage the top and bottom surfaces of the disc, said jaws having tail portions housed in said handle, and manually operated wedge means movably mounted in said handle and arranged between said tail portions for wedging cooperation therewith.

4. A phonograph disc handling device comprising a handle, a pair of opposed spaced wing members rigidly secured to said handle, said wing members having concavely arcuate front edges formed with aligned grooves to receive the rim of a phonograph disc, a pair of opposed clamping jaws pivotally secured to said handle between said wing members and being arranged to clampingly engage the top and bottom surfaces of the disc, said jaws having tail portions housed in said handle, and manually operated wedge means movably mounted in said handle and arranged between said tail portions for wedging cooperation therewith, said wedge means comprising a member rotatably mounted in said handle and having a tapered cam element thereon engaging between said tail portions.

5. A phonograph disc handling device comprising a handle, a pair of opposed spaced wing members rigidly secured to said handle, said wing members having concavely arcuate front edges formed with aligned grooves to receive the rim of a phonograph disc, a pair of opposed clamping jaws pivotally secured to said handle between said wing members and being arranged to clampingly engage the top and bottom surfaces of the disc, said jaws having head portions located between said wing members and tail portions housed inside said handle, spring means biasing said head portions apart, and manually operated wedge means movably mounted in said handle and arranged between said tail portions for wedging cooperation therewith.

6. A phonograph disc handling device comprising a handle, a pair of opposed spaced wing members rigidly secured to said handle, said wing members having concavely arcuate front edges formed with aligned grooves to receive the rim of a phonograph disc, a pair of opposed clamping jaws pivotally secured to said handle between said wing members and being arranged to clampingly engage the top and bottom surfaces of the disc, said jaws having head portions located between said wing members and tail portions housed inside said handle, spring means biasing said head portions apart, and manually operated wedge means movably mounted in said handle and arranged between said tail portions for wedging cooperation therewith, said wedge means comprising a member rotatably mounted in said handle and having a tapered cam element thereon engaging between said tail portions, said head portions being formed with respective seat elements aligned with the grooves in said wing members.

7. A phonograph disc handling device comprising a handle, a pair of opposed spaced wing members rigidly secured to said handle, said wing members having concavely arcuate front edges formed with aligned grooves to receive the rim of a phonograph disc, and manually controlled disc-clamping means carried by said handle between said wing members and being arranged to clampingly engage the top and bottom surfaces of the disc, the grooves being arcuate in curvature along the wing members and the curvature of the portions of the grooves adjacent the disc-clamping means being greater than the curvature of the portions of the grooves adjacent the outer ends of the wing members.

8. A phonograph disc handling device comprising a handle, a pair of opposed spaced wing members rigidly secured to said handle, said wing members having concavely arcuate front edges formed with aligned grooves to receive the rim of a phonograph disc, a pair of opposed clamping jaws pivotally secured to said handle between said wing members and being arranged to clampingly engage the top and bottom surfaces of the disc, said jaws having tail portions housed in said handle, and manually operated wedge means movably mounted in said handle and arranged between said tail portions for wedging cooperation therewith, said wedge means comprising a member rotatably mounted in said handle and having a tapered cam element thereon engaging between said tail portions, the grooves being arcuate in curvature along the wing members and the curvature of the portions of the grooves adjacent the clamping jaws being greater than the curvature of the portions of the grooves adjacent the outer ends of the wing members.

References Cited in the file of this patent

UNITED STATES PATENTS

| | | |
|---|---|---|
| 1,190,581 | Pfeninger | July 11, 1916 |
| 1,729,114 | Louviaux | Sept. 24, 1929 |
| 2,061,083 | Niemi | Nov. 17, 1936 |